(12) United States Patent
Shimizu (10) Patent No.: US 7,397,536 B2
(45) Date of Patent: Jul. 8, 2008

(54) PROJECTION IMAGE DISPLAY APPARATUS

(75) Inventor: Hitoshi Shimizu, Saitama (JP)

(73) Assignee: Fujinon Corporation, Saitama (JP)

( * ) Notice: Subject to any disclaimer, the term of this patent is extended or adjusted under 35 U.S.C. 154(b) by 256 days.

(21) Appl. No.: 11/114,003

(22) Filed: Apr. 26, 2005

(65) Prior Publication Data
US 2005/0237628 A1    Oct. 27, 2005

(30) Foreign Application Priority Data
Apr. 26, 2004 (JP) .............................. 2004-130116

(51) Int. Cl.
*G03B 27/54* (2006.01)
(52) U.S. Cl. .......................................... 355/67; 353/97
(58) Field of Classification Search .................... 353/97; 355/67, 71
See application file for complete search history.

(56) References Cited

U.S. PATENT DOCUMENTS 7,118,227 B2 * 10/2006 Sannohe et al. ............... 353/97
7,126,736 B2 * 10/2006 Itoh et al. ..................... 359/212
7,182,469 B2 *  2/2007 Dewald et al. ................ 353/97
2005/0001997 A1 *  1/2005 Kawaai et al. ................ 353/97

FOREIGN PATENT DOCUMENTS

| JP | 9-96867 | 4/1997 |
| JP | 9-98442 | 4/1997 |
| JP | 2003107396 | * 4/2003 |

* cited by examiner

Primary Examiner—Della J. Rutledge
(74) Attorney, Agent, or Firm—Young & Thompson (57) ABSTRACT

A projection image display apparatus is equipped with a light shielding member for partially shielding the illumination light from the illuminating optical system so as to reduce the image brightness in a region where the intensity of the reflected light reflected between the on-light and off-light becomes strong, and making the intensity of the illumination light emitted to the respective mirror elements uneven.

9 Claims, 7 Drawing Sheets

PROJECTION IMAGE DISPLAY APPARATUS

This application is based on Japanese Patent application JP2004-130116, filed Apr. 26, 2004, the entire content of which is hereby incorporated by reference. This claim for priority benefit is being filed concurrently with the filing of this application.

BACKGROUND OF THE INVENTION

1. Technical Field of the Invention

The present invention relates to a projection image display apparatus equipped with an image generation part in which a plurality of mirror elements are arranged, the mirror elements moving between an on-position at which illumination light from an illuminating optical system is reflected toward a projection optical system and an off-position at which the illumination light is reflected toward the outside of the projection optical system, whereby on-light is reflected from the mirror element located at the on-position constituting an image.

2. Description of the Related Art

A DMD projector provided with a DMD (digital micro mirror device) as the image generation part has been known. The DMD is composed by arranging, in a matrix state, many light reflection angle variable mirror elements capable of being changed between the on-position at which the received illumination light is reflected toward the projection optical system and the off-position at which the illumination light is reflected toward the direction out of the projection optical system. The projected image is composed by the group of the on-light reflected from the mirror element located at the on-position.

The DMD projector has a high optical utilization efficiency since the DMD projector uses the simple light reflection due to the mirror element. Therefore, as compared with an LCD projector, the DMD projector has an advantage that the high-brightness of the projection image can be realized. On the other hand, the DMD projector has a problem in that the off-light reflected from the mirror element located at the off-position is mixed with the on-light and the quality of the projection image is reduced. Therefore, devices are disclosed, in which a shielding film and a light absorbing member are provided between the DMD and the projection optical system, and the off-light from the DMD is absorbed (see JP-A-9-98442 and JP-A-9-96867).

However, the related art devices absorb the off-light, and flat light reflected between the on-light and the off-light is not considered. The flat light is reflected light from a cover glass or the like for mainly protecting the DMD, and a problem exists in that the flat light is mixed with the on-light and thereby the brightness unevenness is generated on the projection image.

SUMMARY OF THE INVENTION

It is an object of the present invention to provide a projection image display apparatus capable of preventing the brightness unevenness of the projection image due to the flat light.

Although the flat light is reflected in a direction inclined to the on-light, since the flat light is reflected toward a range having a certain angle width, a part thereof is mixed with the on-light. The intensity of the flat light is weaker as it gradually travels outward from the peak of the center of the reflective angle width. As a result, the on-light nearer to the reflective direction of the flat light among the on-light from the respective mirror elements is mixed with more flat light, and the brightness of the projection image becomes high.

Therefore, a projection image display apparatus of the present invention is equipped with a light shielding member for partially shielding the illumination light from the illuminating optical system so as to reduce the image brightness in a region where the intensity of the reflected light reflected between the on-light and off-light becomes strong, and making the intensity of the illumination light emitted to the respective mirror elements uneven.

It is preferable that the projection image display apparatus is further equipped with an adjusting mechanism for slidably holding the light shielding member within a plane vertical to an illumination light axis and changing the shielding range of the illumination light.

The projection image display apparatus of the present invention makes the intensity of the illumination light emitted to the respective mirror elements uneven by using the light shielding member, and the illumination light weakened previously is emitted in the region where more flat light is mixed and the brightness of the projection image becomes high. Thereby, the brightness unevenness of the projection image can be prevented.

No unnecessary excess of the cut of the illumination light occurs by making the light shielding member a sliding type to change the emitting range of the illumination light, and the brightness unevenness can be efficiently prevented.

DETAILED DESCRIPTION OF THE INVENTION

Figure 1:
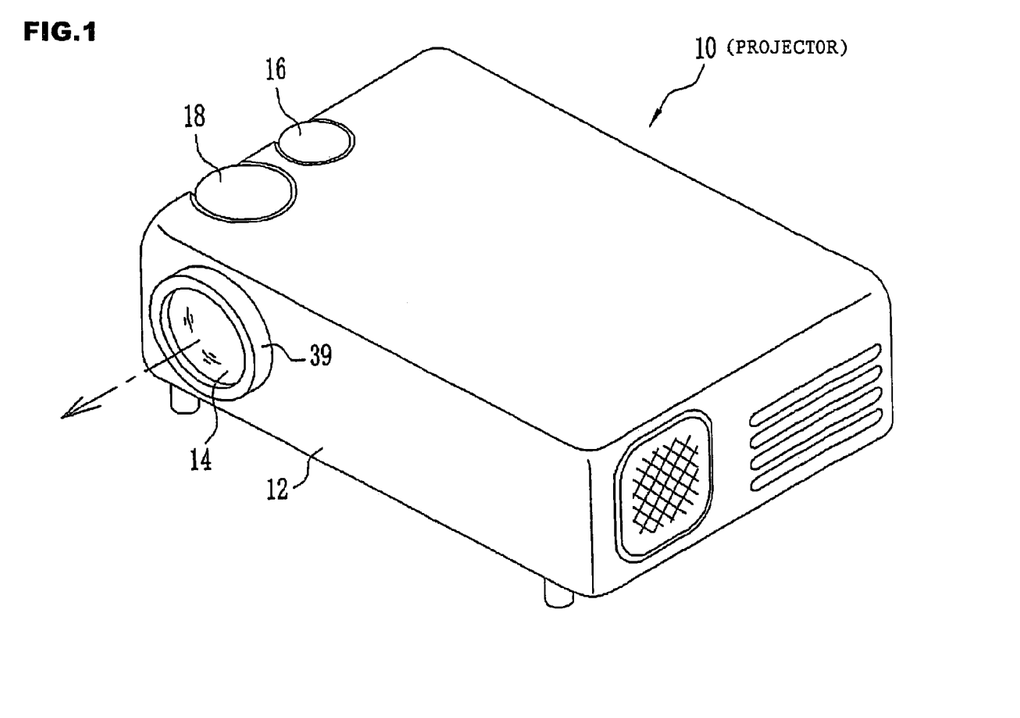
FIG. 1 is an appearance diagram of one embodiment of a projector.

FIG. 1 shows the external appearance of a projector 10 of the present invention. A projection lens 14 is exposed on the front of a housing 12 by opening a lens cover at the time of using the projector 10. A screen 15 (see FIG. 2) is arranged in front of the projection lens 14, and an image is projected from the projection lens 14. A zoom dial 16 and a focus dial 18 are provided in the housing 12, and the variable power and focusing of the projection lens 14 can be performed by operating the dials.

Figure 2:
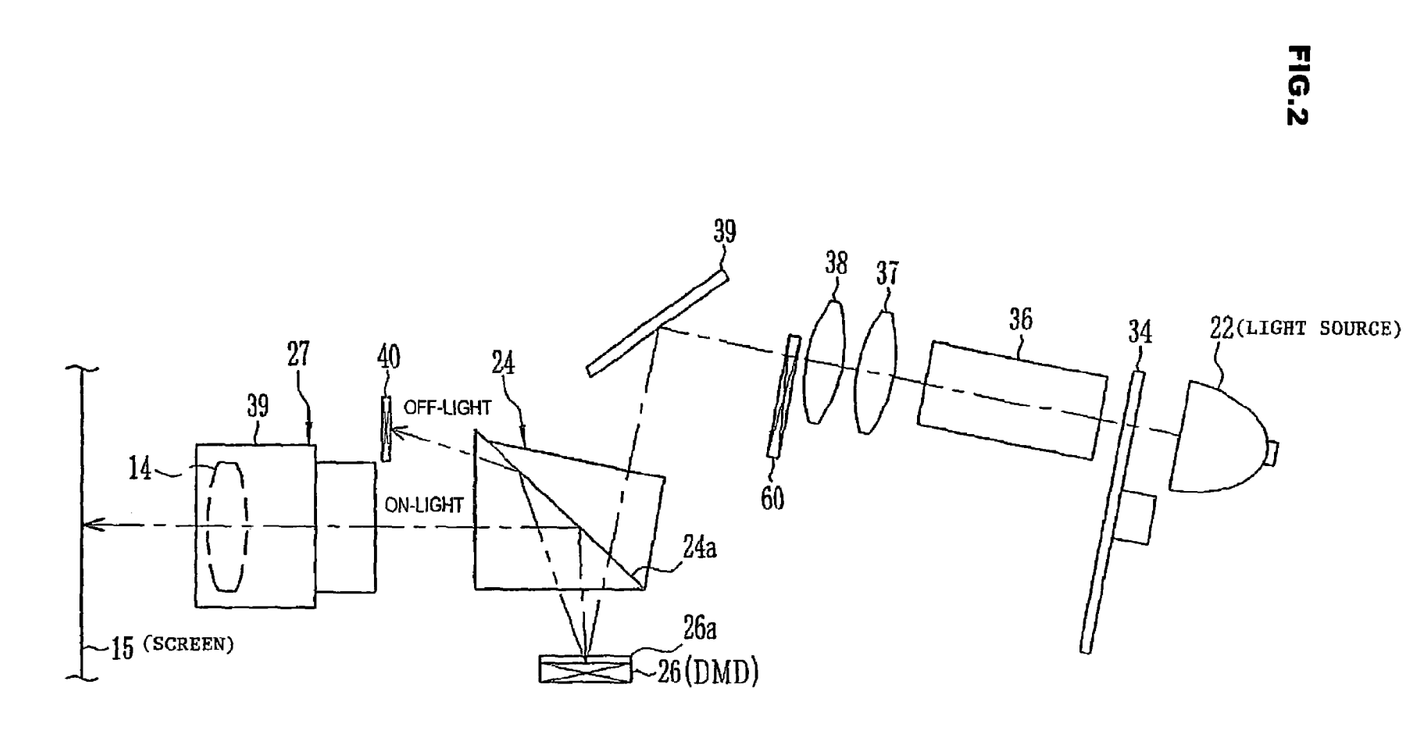
FIG. 2 is a constitution diagram of the projector.

FIG. 2 shows the schematic constitution diagram of the projector 10. A light source 22, an illuminating optical system, a total reflection prism 24, a DMD 26 and a projection optical system 27 are provided in the housing 12. As the light source 22, for example, white light sources such as a xenon lamp and a mercury lamp are used. Illumination light emitted from the light source 22 enters the illuminating optical system.

The illuminating optical system is composed by a color wheel 34, a rod integrator 36 and relay lenses 37 and 38. The color wheel 34 separates the illumination light from the light source 22 into three colors of B, G, R in time division manner. The color wheel 34 is composed by arranging filters of three colors of a B filter for transmitting only B light, a G filter for transmitting only G light and an R filter for transmitting only R light at a nearly equal distance from the center of rotation of the substrate on an approximately disk-shaped substrate. The color wheel 34 rotates at a high speed, and inserts the filters of respective colors into an illumination light path 30 sequentially. As a result, the illumination light is color-separated to three colors of B, G, R in time division manner, and the light of the respective colors separated are sequentially emitted toward the DMD 26.

For example, the rod integrator 36 is made of glass, and a reflective surface is formed on the inside thereof. The light separated by the color wheel 34 is uniformized by repeating a reflection while transmitting the rod integrator 36. The relay lenses 37 and 38 relay the light flux emitted from the rod integrator 36 to a mirror 39. The mirror 39 reflects the light flux from the illuminating optical system toward the total reflection prism 24.

The total reflection prism 24 separates incident light incident on the DMD 26 from the relay lenses 37 and 38 and reflected light reflected by the DMD 26. For example, the total reflection prism 24 is composed by two triangular prisms having the refractive indices different from each other, and a reflective surface 24a is formed at the boundary between two triangular prisms. Since the incident light has the incident angle smaller than the critical angle, the incident light transits the reflective surface 24a and enters the DMD 26. On the other hand, since the reflected light reflected by DMD 26 has the incident angle larger than the critical angle, the reflected light is totally reflected on the reflective surface 24a.

As is known, the DMD 26 is composed by arranging a large number of mirror elements corresponding to pixels in a matrix state on the back of a cover glass 26a. The respective mirror elements change the angles thereof based on the projected image to change the reflective direction of the received illumination light. When the pixels are brightly displayed, the mirror elements are moved to the on-position, and the received light is reflected as the on-light toward the projection optical system 27. On the other hand, when the pixels are darkly displayed, the mirror elements are moved to the off-position, and the received light is reflected as the off-light in the direction out of the projection optical system 27. Image light is composed by the group of the on-light traveling to the projection optical system 27.

Although the projection optical system 27 is shown in a simplified form where a projection lens 14 is arranged in a lens barrel 39 in FIG. 2, the projection optical system 27 comprises a plurality of lens groups arranged on the optical axis, and a lens moving mechanism for performing the variable power and the focusing. The image light generated by the DMD 26 is formed into an image on the screen 15 by the projection optical system 27.

Although the image light is preferably composed by only the on-light described above, when the off-light reflects freely in the housing 12 and is mixed with the on-light, the quality of the projection image is deteriorated. Therefore, a light absorbing member 40 is provided between the projection optical system 27 and the total reflection prism 24. For example, the light absorbing member 40 is obtained by arranging a black cloth on a plate, and absorbs the off-light emitted from the total reflection prism 24. Thus, the light absorbing member 40 prevents the problem in that the off-light reflects freely in the housing 12 and is mixed with the on-light, thereby deteriorating the quality of the projection image.

Figure 3:
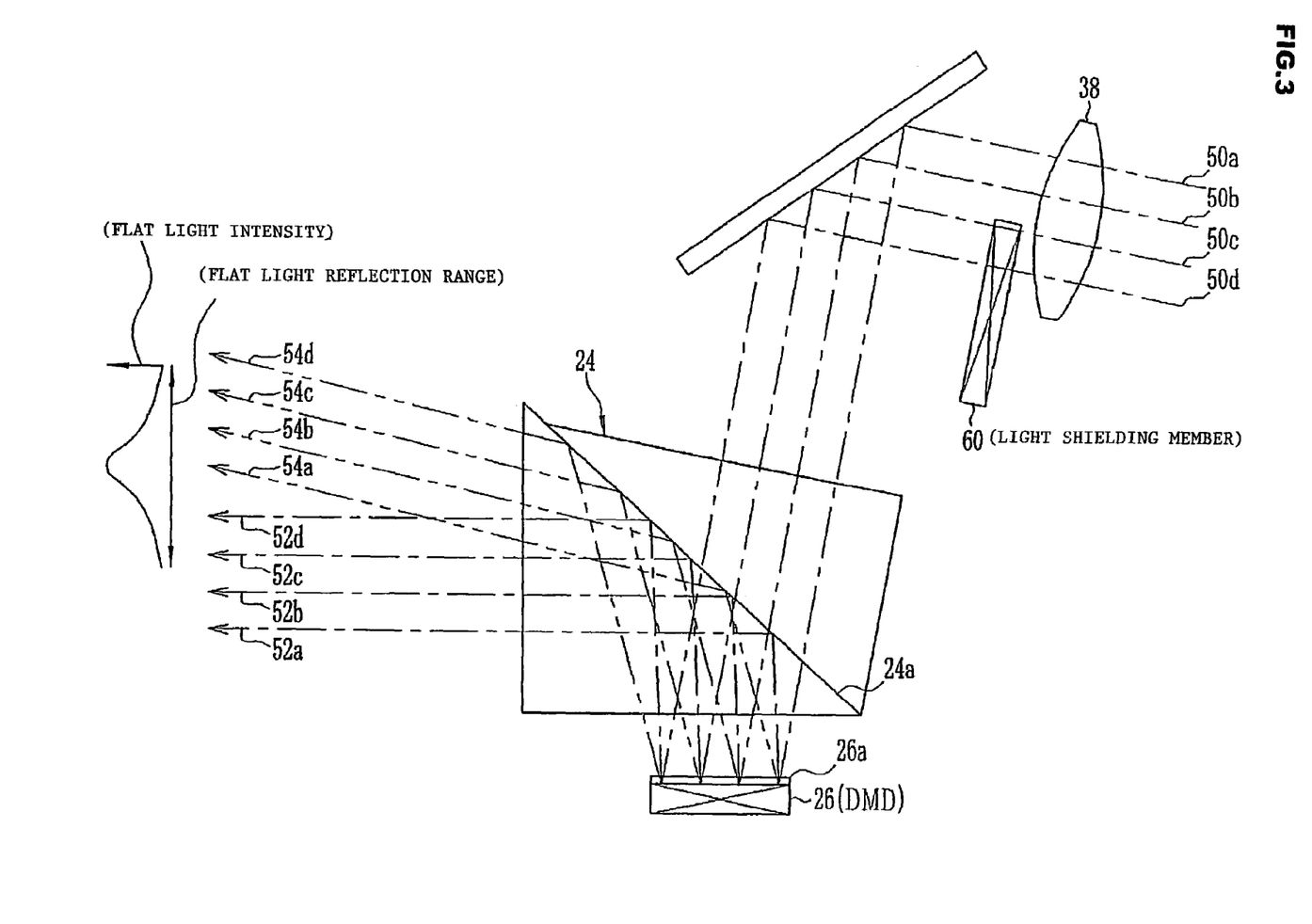
FIG. 3 is an illustration showing the reflective range of flat light and the intensity of the flat light.

However, only the absorption of the off-light due to the light absorbing member 40 causes the brightness unevenness on the projection image by the light (flat light) reflected from the cover glass 26a of the DMD 26. That is, as shown in FIG. 3, when the illuminations 50a to 50d from the illuminating optical system enter the DMD 26, and respective mirror elements of the DMD 26 are located at the on-position, the illuminations 50a to 50d are reflected as the on-light 52a to 52d shown by dotted lines in FIG. 3. When the respective mirror elements are located at the off-position, the illuminations 50a to 50d are reflected as the off-light 54a to 54d shown by chain double-dashed lines in FIG. 3.

At this time, the illuminations 50a to 50d from the illuminating optical system are partially reflected by the cover glass 26a. The reflected light reflected by the cover glass 26a is the flat light, and the flat light is reflected with a certain angle width in the direction which is substantially in parallel with the reflective direction of the off-light 54a to 54d in the example of FIG. 3. Although the flat light is reflected in the direction inclined to the on-light, since the flat light has a reflective angle width, a part thereof is projected together with the on-light. The intensity of the flat light is weaker as it gradually travels outward from the peak of the center of the reflective angle width. As a result, in the example shown in FIG. 3, the on-light 52d which is near the reflective direction of the flat light among the on-light 52a to 52d from the respective mirror elements is mixed with more flat light, and the brightness of the projection image is increased.

Figure 4:
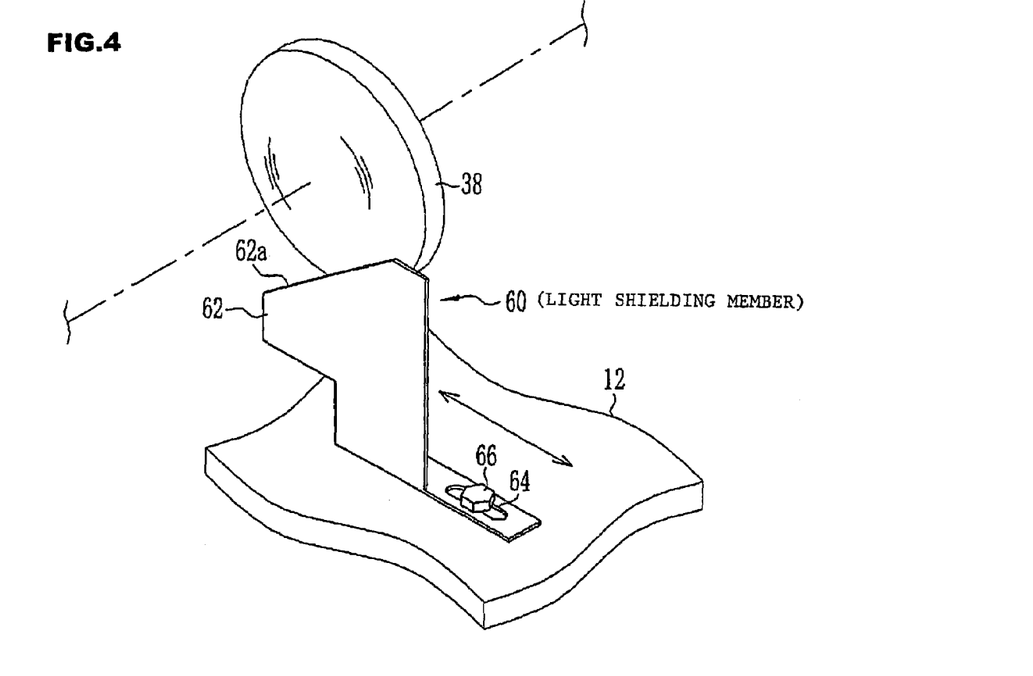
FIG. 4 is a perspective view of one embodiment of a light shielding member.
Figure 5:
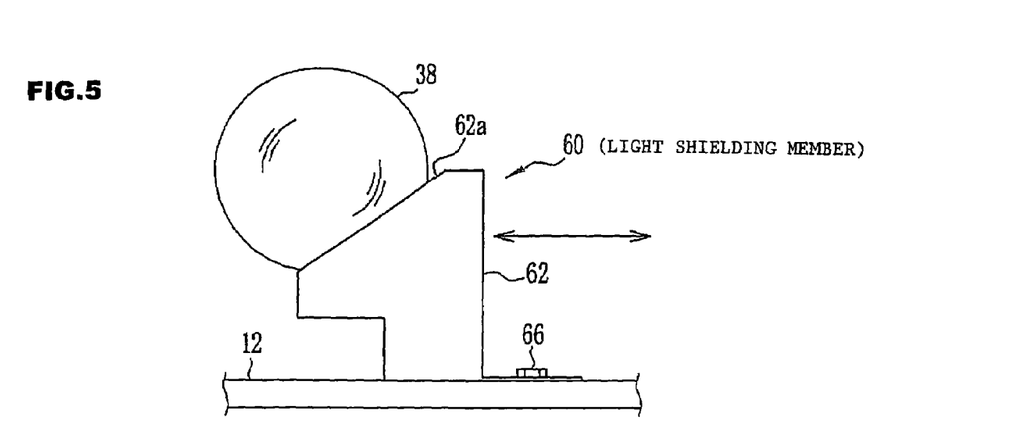
FIG. 5 is a plan view of the light shielding member.

Therefore, a light shielding member 60 between the illuminating optical system and the total reflection prism 24 is provided in the projector 10. As shown in FIG. 4 and FIG. 5, a plate-like light shielding part 62 for shielding the illumination light from the illuminating optical system partially, and an oblong hole 64 extending in the direction vertical to the illumination light axis are formed on the light shielding member 60. A bolt 66 is inserted into the oblong hole 64, and thereby the light shielding member 60 is held movably. Thus, the shielding range of the illumination light can be adjusted by the light shielding part 62.

In the light shielding part 62, the side part 62a of the side of the relay lens 38 is inclined to the moving direction of the light shielding member 60 so that the intensity of the illumination light is gradually decreased as it travels to the illumination light 50d from the illumination light 50a in FIG. 3. Thus, the illumination light is partially shielded by the light shielding part 62, and the light shielding member 60 makes the intensity of the illumination light emitted to the DMD 26 uneven. As a result, the brightness of the projection image is reduced as it travels to the side of the on-light 52d.

Hereinafter, the action of the present invention having the above configuration will be described. The illumination light from the illuminating optical system is partially cut by the light shielding member 60. The light shielding member 60 makes the intensity of the illumination light emitted to the light-receiving surface of the DMD 26 uneven so that the image brightness in the region where the brightness of the projection image due to the mixture of the flat light is increased is reduced.

When the mirror element is located at the on-position, the illumination light entering the DMD 26 is reflected as the on-light toward the projection optical system. When the mirror element is located at the off-position, the illumination light entering the DMD 26 is reflected as the off-light toward the outside of the projection optical system. The illumination light entering the DMD 26 is partially reflected as the flat light by the cover glass 26a of the DMD 26. The projection image is composed by the group of the on-light.

Although the image brightness is increased in the region where the flat light is mixed among the projection image, the amount of the illumination light emitted to the region is reduced by the light shielding member 60. Thereby, the brightness unevenness generated in the projection image can be prevented. Since the light shielding member 60 is movably provided, the shielding range of the illumination light can be adjusted by loosening the bolt 66 and moving the light shielding member 60 so that the effective illumination light is not cut while the brightness unevenness is prevented.

Thus, since the amount of the illumination light emitted to the region where the brightness of the projection image is increased by the mixture of the flat light is previously reduced by the light shielding member 60, the projector 10 can prevent the brightness unevenness of the projection image. Since the light shielding member 60 can be moved and the shielding range of the illumination light can be adjusted, no unnecessary excess of cut of the illumination light occurs.

Figure 6A:
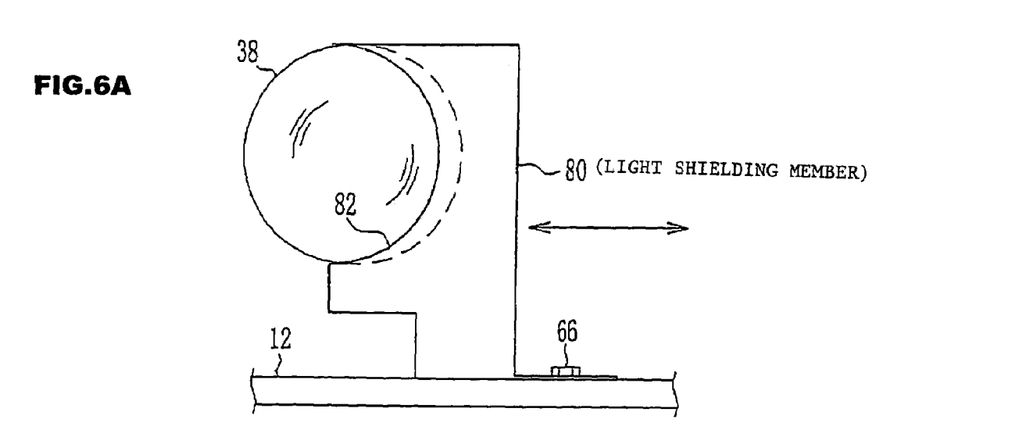
FIGS. 6A and 6B are Plan views of another embodiments of the light shielding member.
Figure 6B:
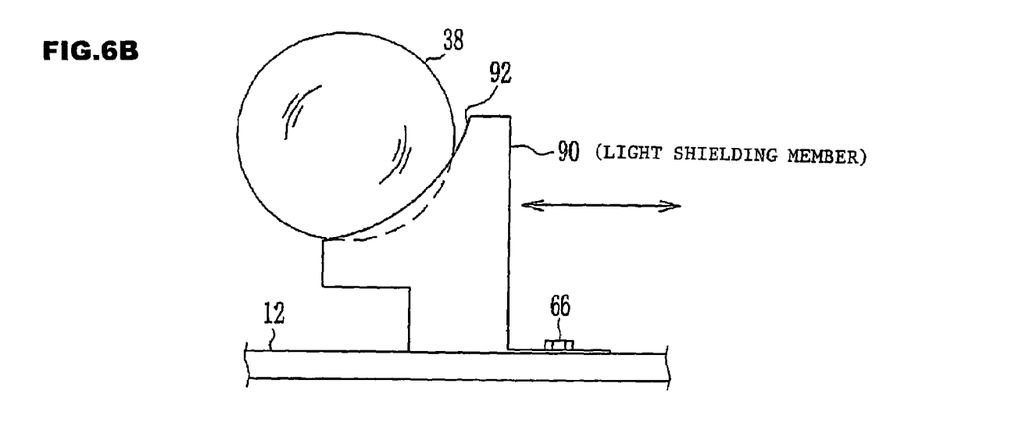

In the present invention, the luminous flux density of the illumination light emitted to the DMD is made uneven by the light shielding member, and the amount of the illumination light emitted to the region where the brightness of the projection image is increased by the influence of the flat light is previously reduced. Thereby, the shape of the light shielding member may be suitably changed. Examples of the shapes of the light shielding members include the shape of a light shielding member in which a circular arc side part 82 is formed as shown by a light shielding member 80 in FIG. 6A, and the shape of another light shielding member in which a circular arc side part 92 inclined to the moving direction is formed as shown by a light shielding member 90 in FIG. 6B. Numerous small holes for transmitting the illumination light may be formed near the side part of the light shielding member, and the amount of the illumination light transmitted may be adjusted by adjusting the arrangement intervals of the small holes. The same members as the embodiments described above are designated by the same reference numerals in the drawings after FIGS. 6A and 6B.

Figure 7:
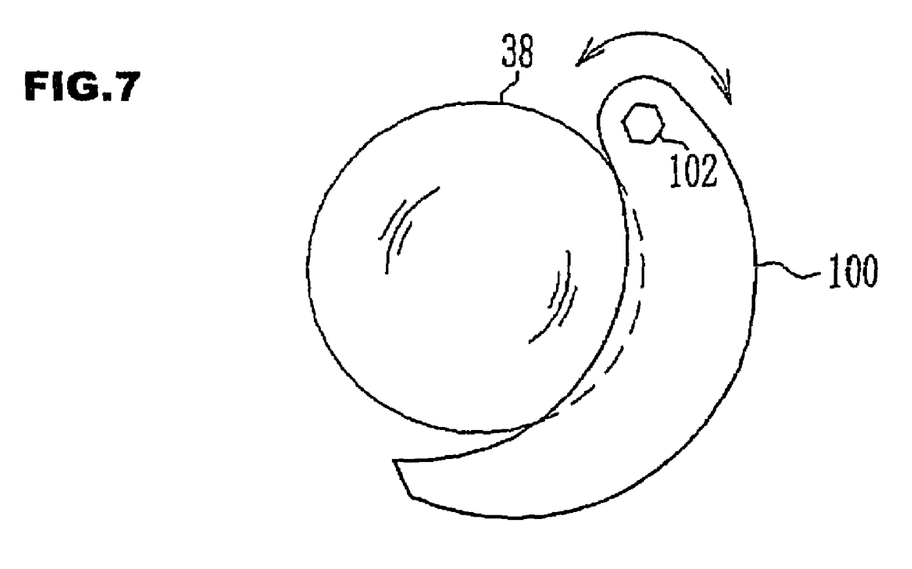
FIG. 7 is a plan view of another embodiment of the light shielding member.

Although the light shielding member is slidably provided in the above embodiment, the light shielding member may be a fixed type. Furthermore, a light shielding member 100 shown in FIG. 7 may be made rotatable around the bolt 102.

Although the light shielding member arranged just behind the relay lens is described in the above embodiment, the arrangement position of the light shielding member may be suitably changed between the illuminating optical system and the DMD. Although the example movably holding the light shielding member by using the bolt and the oblong hole is described in the above embodiment, the holding method of the light shielding member is not limited thereto, and known holding methods can be suitably selected.

As described above, the example of the reflected light from the cover glass of the DMD is described as the flat light. However, the reflected light from the mirror element moving between the on-position and the off-position is also contained as the flat light. The present invention is also effective for preventing the brightness unevenness of the projection image due to the flat light.

Figure 8:
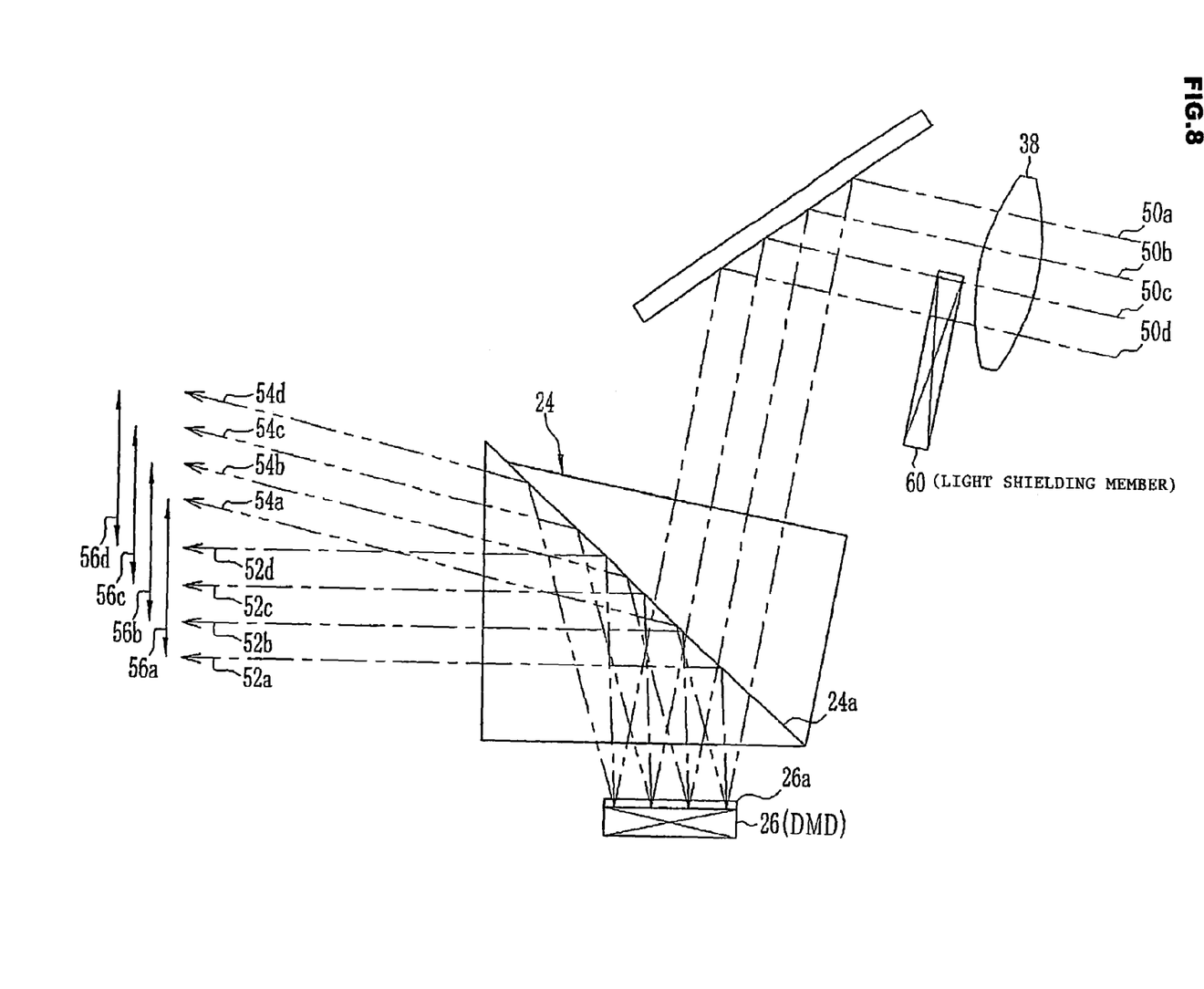
FIG. 8 is an illustration showing the state where the flat light overlaps.

That is, as shown in FIG. 8, when the illuminations 50a to 50d from the illuminating optical system enter the DMD 26 and respective mirror elements of the DMD 26 are located at the on-position, the illuminations are reflected as the on-light 52a to 52d shown by dotted lines in FIG. 8. When the respective mirror elements are located at the off-position, the illuminations are reflected as the off-light 54a to 54d shown by chain double-dashed lines in FIG. 8. When the mirror element is located at the flat position between the on-position and the off-position during the displacement or the like, the illumination light is reflected as the flat light between the on-light and the off-light. When illumination light 50a to 50d are reflected as the flat light, the flat light reflective ranges 56a to 56d overlap while shifting in the reflective direction of the off-light gradually. As a result, in the example shown in FIG. 8, the flat light from a plurality of mirror elements overlaps as it travels to the side of the on-light 52d, and the brightness of the projection image is increased.

The light shielding member 60 of the present invention partially shields the illumination light so that the intensity of the illumination light is reduced as it travels to the illumination light 50d from the illumination light 50a, and makes intensity of the illumination light emitted to the DMD 26 uneven. Thus, since the amount of illumination light emitted to the region where the brightness of the projection image is increased by the overlapping of the flat light is previously reduced, the light shielding member 60 of the present invention can also prevent the brightness unevenness of the projection image due to the flat light reflected from the mirror element moving between the on-position and the off-position.

What is claimed is:

1. A projection image display apparatus comprising:

an image generation part in which a plurality of mirror elements are arranged, the mirror elements moving between an on-position at which illumination light from an illuminating optical system is reflected toward a projection optical system and an off-position at which the illumination light is reflected toward an outside of the projection optical system, whereby on-light reflected from the mirror element located at the on-position constitutes an image; and a light shielding member in the path of the illumination light between the illuminating optical system and the image generation part that i) partially shields the illumination light so as to reduce image brightness in a region where an intensity of reflected light reflected between the on-light and off-light reflected from the mirror element located at the off-position becomes strong, and ii) makes the intensity of the illumination light emitted to respective mirror elements uneven, wherein the light shielding member has a linear side part inclined to a moving direction of the light shielding member.

2. The projection image display apparatus according to claim 1, which further comprises an adjusting mechanism that slidably holds the light shielding member within a plane vertical to an illumination light axis and changes a shielding range of the illumination light.

3. A projector comprising:

a digital micro mirror device; and a light shielding member that shields a part of a light directed to the digital micro mirror device so as to make an intensity of the light incident upon the digital micro mirror device uneven, wherein the light shielding member has a linear side part inclined to a moving direction of the light shielding member.

4. The projector according to claim 3, wherein the projector further comprises a relay lens and the light shielding member is disposed just behind the relay lens.

5. The projector according to claim 3, which further comprises an adjusting mechanism that slidably holds the light shielding member within a plane vertical to an illumination light axis.

6. A projection image display apparatus comprising:

an image generation part in which a plurality of mirror elements are arranged, the mirror elements moving between an on-position at which illumination light from an illuminating optical system is reflected toward a projection optical system and an off-position at which the illumination light is reflected toward an outside of the projection optical system, whereby on-light reflected from the mirror element located at the on-position constitutes an image; and a light shielding member in the path of the illumination light between the illuminating optical system and the image generation part that i) partially shields the illumination light from the illuminating optical system so as to reduce image brightness in a region where an intensity of reflected light reflected between the on-light and off-light reflected from the mirror element located at the off-position becomes strong, and ii) makes the intensity of the illumination light emitted to respective mirror elements uneven, wherein the light shielding member has a circular arc side part.

7. The projection image display apparatus according to claim 6, wherein the circular arc side part is inclined to a moving direction of the light shielding member.

8. A projector comprising:

a digital micro mirror device; and a light shielding member that shields a part of a light directed to the digital micro mirror device so as to make an intensity of the light incident upon the digital micro mirror device uneven, wherein the light shielding member has a circular arc side part.

9. The projector accordant to claim 8, wherein the circular arc side part is inclined to a moving direction of the light shielding member.

* * * * *